(No Model.)

E. RUBIN.
BULLET.

No. 338,191. Patented Mar. 16, 1886.

WITNESSES

INVENTOR
Eduard Rubin
By his Attorneys

UNITED STATES PATENT OFFICE.

EDUARD RUBIN, OF THUN, SWITZERLAND.

BULLET.

SPECIFICATION forming part of Letters Patent No. 338,191, dated March 16, 1886.

Application filed May 8, 1885. Serial No. 164,767. (No model.)

*To all whom it may concern:*

Be it known that I, EDUARD RUBIN, of Thun, in the Republic of Switzerland, have invented certain new and useful Improvements in Rifle-Bullets, of which the following is a specification.

This invention has reference to that class of rifle-bullets in which an interior core of soft metal is inclosed in an exterior casing of hard metal; and the invention consists of a rifle-bullet of lead or other soft metal inclosed by a casing of harder metal, which casing is of greater thickness at the point and bent over the base of the bullet.

Figure 3:
Figure 1:
Figure 2:
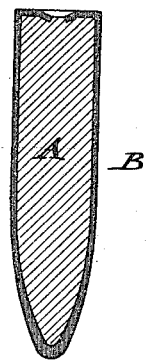
Figure 4:
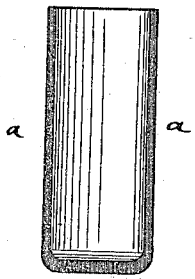

In the accompanying drawings, Figures 1 and 2 represent, respectively, a side view and a vertical central section of my improved bullet; and Figs. 7, 6, 5, 4, and 3 represent the different stages through which the casing or covering-shell passes in the course of making the bullet.

Similar letters of reference indicate corresponding parts.

In the drawings, A represents a ball of lead, cobalt, or other soft metal; and B, a casing or covering-shell, which is made of steel, iron, copper, or other suitable hard metal.

Figure 5:
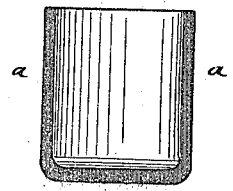
Figure 6:
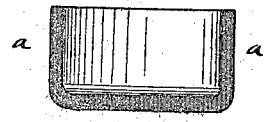
Figure 7:
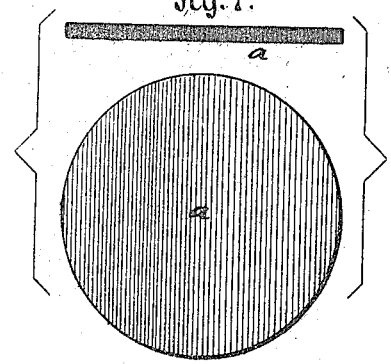

The casing or covering-shell B is made from a disk-shaped blank, $a$, which is drawn into cup shape, after which the side wall of the cup is drawn out to the length required by the size of the ball A, as shown in Figs. 6, 5, 4, and 3. The thicker bottom of the shell is finally shaped so as to form the point of the bullet, which is thereby of greater thickness than the side of the casing. When the casing or shell B has been drawn out to its proper length, the ball A is inserted into the same and the shell bent over the base of the ball, as shown in Fig. 5. The bullet is then pressed into the desired shape, whereby the ball and casing are intimately united. Any shape may be given to the ball by pressure. Owing to the thickness of the bottom of the shell, the point retains its greater thickness, as shown in Fig. 2.

If the ball be made of cobalt, which has a comparatively high specific gravity, the same is placed in pulverized form into the shell. The latter is then bent over at the base and the bullet finally pressed into proper shape in a bullet-press.

I am aware that rifle-bullets consisting of a soft-metal core and an inclosing-casing of harder metal have been made heretofore for the purpose of avoiding the leading of the rifle-grooves of the barrel that takes place by using bullets having an exterior shell of soft metal. My invention is an improvement on this class of bullets, as by the thickening of the casing at the point a greater penetrating power and greater steadiness in flight is obtained.

Having thus described my invention, I claim as new and desire to secure by Letters Patent—

A rifle-bullet consisting of a ball or core of lead or other soft metal and an exterior casing or covering-shell of harder metal that is thicker at the point and lapped over the base of the core, substantially as set forth.

In testimony that I claim the foregoing as my invention I have signed my name in presence of two subscribing witnesses.

ED. RUBIN.

Witnesses:
 N. YERBE,
 R. MULTZ,
  *Gas-Director.*